(12) United States Patent
Toda et al.

(10) Patent No.: US 10,350,838 B2
(45) Date of Patent: *Jul. 16, 2019

(54) DISPLAY AND LABELED ARTICLE

(71) Applicant: TOPPAN PRINTING CO., LTD., Tokyo (JP)

(72) Inventors: Toshiki Toda, Tokyo (JP); Akira Nagano, Tokyo (JP); Shingo Maruyama, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 14/595,802

(22) Filed: Jan. 13, 2015

(65) Prior Publication Data

US 2015/0124323 A1     May 7, 2015

Related U.S. Application Data

(63) Continuation of application No. 12/216,536, filed on Jul. 7, 2008, which is a continuation of application No. PCT/JP2007/070182, filed on Oct. 16, 2007.

(30) Foreign Application Priority Data

Oct. 24, 2006 (JP) ................................. 2006-288842
Aug. 6, 2007 (JP) ................................. 2007-204651

(51) Int. Cl.
*B29C 70/54* (2006.01)
*B42D 25/00* (2014.01)
(Continued)

(52) U.S. Cl.
CPC ............ *B29C 70/546* (2013.01); *B42D 25/00* (2014.10); *G02B 5/1809* (2013.01);
(Continued)

(58) Field of Classification Search
CPC ...... G02B 5/18; G02B 5/1809; G02B 5/1814; G02B 5/1819; G02B 5/1842;
(Continued)

(56) References Cited

U.S. PATENT DOCUMENTS 4,568,141 A    2/1986 Antes .................................. 359/2
4,737,448 A    4/1988 Hochberg ...................... 430/321
(Continued)

FOREIGN PATENT DOCUMENTS

BR    PI 9509311-7 A    10/1997
BR    PI 0411908-8 A    8/2006
(Continued)

OTHER PUBLICATIONS

International Search Report dated Jan. 29, 2008 in connection with the International Application No. PCT/JP2007/070182.
(Continued)

*Primary Examiner* — Kimberly N. Kakalec

(57) ABSTRACT

A higher forgery prevention effect is realized. A display includes a first interface section provided with a relief-type diffraction grating constituted by a plurality of grooves, and a second interface section provided with a plurality of recesses or projections arranged two-dimensionally at a center-to-center distance smaller than the minimum center-to-center distance of the plural grooves, and each having a forward tapered shape.

26 Claims, 11 Drawing Sheets

(51) Int. Cl.
*B42D 25/324* (2014.01)
*B42D 25/328* (2014.01)
*G02B 5/18* (2006.01)

(52) U.S. Cl.
CPC ......... *G02B 5/1842* (2013.01); *G02B 5/1861* (2013.01); *B42D 25/324* (2014.10); *B42D 25/328* (2014.10); *B42D 2035/24* (2013.01)

(58) Field of Classification Search
CPC .. G02B 5/1861; G02B 5/1866; B29C 70/546; B42D 25/00; B42D 25/328; B42D 25/324; B42D 2035/24
USPC ............ 359/2, 558, 566–567, 569, 571–572, 359/574–576; 283/86
See application file for complete search history.

(56) References Cited

U.S. PATENT DOCUMENTS

| | | | |
|---|---|---|---|
| 5,483,363 A | 1/1996 | Holmes et al. | 359/2 |
| 5,567,276 A | 10/1996 | Boehm et al. | |
| 5,784,200 A * | 7/1998 | Modegi | G02B 5/1847 359/2 |
| 5,909,313 A | 6/1999 | Lee | 359/569 |
| 5,912,767 A * | 6/1999 | Lee | B41M 3/12 283/902 |
| 6,243,202 B1 | 6/2001 | Wilhelm | |
| 6,296,281 B1 | 10/2001 | Stone | 283/93 |
| 6,324,004 B1 | 11/2001 | Staub et al. | |
| 6,765,704 B2 | 7/2004 | Drinkwater | 359/2 |
| 7,002,746 B2 * | 2/2006 | Schilling | B42D 25/328 359/566 |
| 7,226,087 B2 | 6/2007 | Alasia et al. | 283/74 |
| 2004/0021945 A1 * | 2/2004 | Tompkin | G02B 5/18 359/566 |
| 2004/0179266 A1 | 9/2004 | Schilling et al. | 359/558 |
| 2004/0239099 A1 | 12/2004 | Tompkin et al. | |
| 2006/0056028 A1 | 3/2006 | Wildnauer | 359/575 |
| 2006/0274392 A1 | 12/2006 | Schilling et al. | |
| 2007/0058227 A1 | 3/2007 | Raksha et al. | 359/2 |
| 2007/0273142 A1 * | 11/2007 | Tompkin | B42D 25/324 283/72 |
| 2009/0179418 A1 | 7/2009 | Stalder | 283/85 |
| 2018/0257320 A1 * | 9/2018 | Toda et al. | B29C 70/546 |

FOREIGN PATENT DOCUMENTS

| | | |
|---|---|---|
| BR | PI 0509102-0 A | 8/2007 |
| DE | 10308327 | 9/2004 |
| EP | 0 486 065 A2 | 5/1992 |
| EP | 1 434 695 A | 7/2004 |
| JP | 2-72320 | 3/1990 |
| JP | 8-75912 | 3/1996 |
| JP | 8-122510 | 5/1996 |
| JP | 10-123307 | 5/1998 |
| JP | 2001-264520 | 9/2001 |
| JP | 2004-61905 | 2/2004 |
| JP | 2006-38928 | 2/2006 |
| JP | 2006-528369 | 12/2006 |
| JP | 2007-531906 | 11/2007 |
| WO | 94/28444 | 12/1994 |
| WO | 2005/009751 A2 | 2/2005 |
| WO | 2005/095119 A1 | 10/2005 |

OTHER PUBLICATIONS

English Translation of the International Preliminary Report on Patentability dated May 7, 2009 in corresponding International Patent Application PCT/JP2007/070182.
Japanese Office Action dated Jul. 12, 2011 in corresponding Japanese Patent Application 2006-288842.
Extended European Search Report dated Oct. 1, 2012 in corresponding European Patent Application No. 07829916.1.
Office Action dated from the United Stated Patent and Trademark Office on Dec. 13, 2012 in the related U.S. Appl. No. 12/216,536.
Office Action dated from the United Stated Patent and Trademark Office on Aug. 30, 2013 in the related U.S. Appl. No. 12/216,536.
Office Action dated from the United Stated Patent and Trademark Office on Mar. 20, 2014 in the related U.S. Appl. No. 12/216,536.
Notice of Allowance dated from the United Stated Patent and Trademark Office on Oct. 3, 2014 in the related U.S. Appl. No. 12/216,536.
U.S. Appl. No. 12/216,536, filed Jul. 7, 2008, Toshiki Toda et al., Toppan Printing Co., Ltd.
European Search Report for EP Application No. 17194429.1 dated Feb. 22, 2018.
Office Action dated May 22, 2018, in corresponding Brazilian Patent Application No. PI 0717621-0, 12 pgs.

* cited by examiner

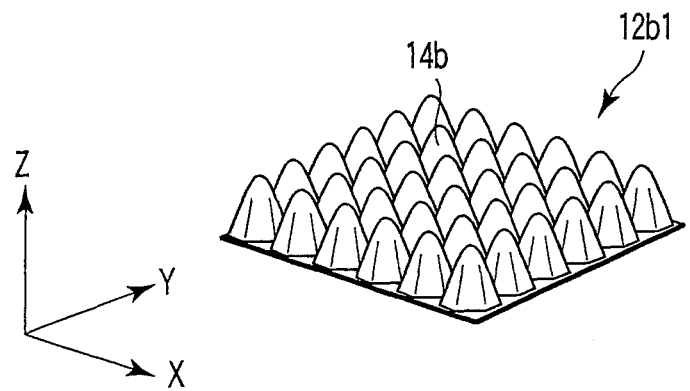
F I G. 19A
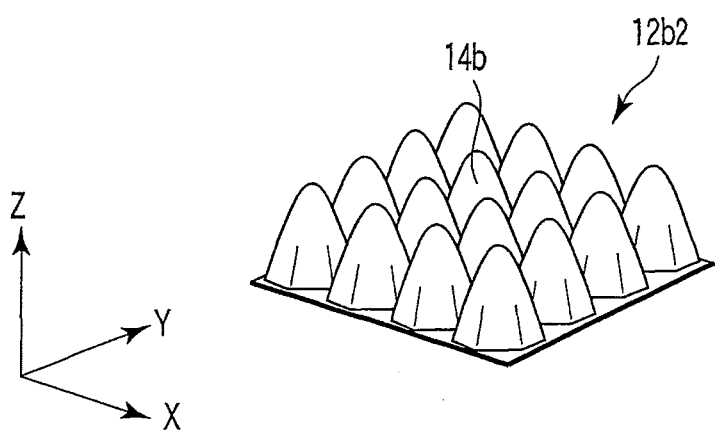
F I G. 19B

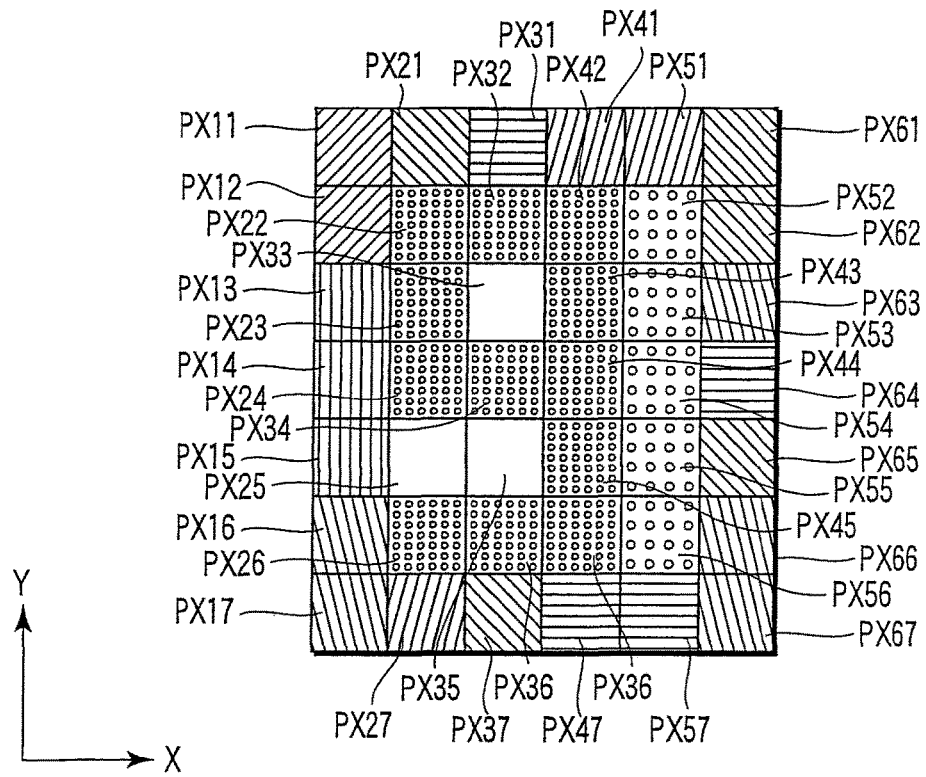
F I G. 20
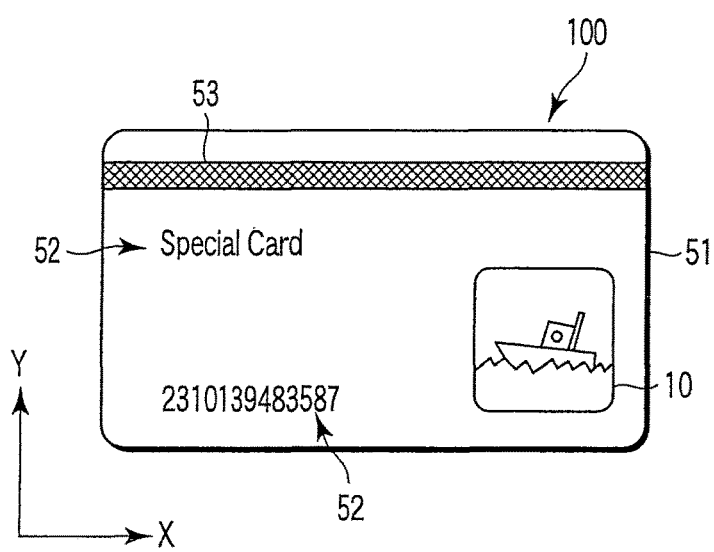
F I G. 21

DISPLAY AND LABELED ARTICLE

CROSS-REFERENCE TO RELATED APPLICATIONS

This application is a continuation of and claims priority benefit to U.S. patent application Ser. No. 12/216,536, filed Jul. 7, 2008, allowed, which U.S. application Ser. No. 12/216,536 in turn is a continuation based on and claiming priority benefit to PCT Application No. PCT/JP2007/070182, filed Oct. 16, 2007, and which PCT patent application is based upon and claims the foreign priority benefit of Japanese Patent Application No. 2006-288842, filed Oct. 24, 2006, and Japanese Patent Application No. 2007-204651, filed Aug. 6, 2007, the entire contents of each of the foregoing are incorporated herein by reference.

BACKGROUND

1. Field

The present invention relates to a forgery prevention technique.

2. Description of Related Art

It is desirable that authentication articles such as cash cards, credit cards and passports and securities such as gift certificates and stock certificates be difficult of forgery. For that reason, heretofore, a label which is difficult of forgery or imitation and which makes it easy to distinguish a genuine article from a forged article or an imitated article has been attached to such an article in order to suppress the forgery.

Further, in recent years, circulation of forged articles is regarded as a problem also with respect to articles other than the authentication articles and securities. For this reason, opportunities have been increasing to apply the forgery prevention technique mentioned above with respect to the authentication articles and the securities to such articles.

In Jpn. Pat. Appln. KOKAI Publication No. 2-72320, a display in which a plurality of pixels are arranged is described. In this display, each pixel includes a relief-type diffraction grating in which a plurality of grooves are arranged.

This display displays an image by utilizing diffracted light, and hence it is impossible to forge the display by utilizing the printing technique or electrophotographic technique. Accordingly, if this display is attached to an article as a label for authentication, seeing the image displayed by the label makes it possible to confirm that the article is genuine. Therefore, an article to which this label is attached is hardly forged as compared with an article to which this label is not attached.

However, the above-mentioned relief-type diffraction grating can be formed with comparative ease if a device such as a laser is available. Further, in the above display, although a change in the display image is caused by changing an angle of incidence of the illumination light, an observation angle or an orientation of the display, the change is not so rich in variety. Therefore, with the development of the technology, the forgery prevention effect of this display is becoming lower. Incidentally, difficulty of forgery or imitation, or ease in distinction of a genuine article from a forged or imitated article is called here a forgery prevention effect.

SUMMARY

An object of the present invention is to realize a higher forgery prevention effect.

According to a first aspect of the present invention, there is provided a display comprising a first interface section provided with a relief-type diffraction grating constituted by a plurality of grooves, and a second interface section provided with a plurality of recesses or projections arranged two-dimensionally at a center-to-center distance smaller than the minimum center-to-center distance of the plural grooves and each having a forward tapered shape.

According to a second aspect of the present invention, there is provided a display comprising a first interface section provided with a relief-type diffraction grating constituted by a plurality of grooves, and a second interface section constituted by a plurality of regions each including a plurality of recesses or projections arranged one-dimensionally or two-dimensionally, wherein one part of the plural regions and another part of the plural regions are different from each other in center-to-center distances of the plural recesses or projections, the minimum center-to-center distance of the plural grooves is equal to or larger than the minimum wavelength of the visible light, and the center-to-center distance of the plural recesses or projections is smaller than the minimum wavelength of the visible light.

According to a third aspect of the present invention, there is provided a labeled article comprising the display according to claim 1 or 2; and an article supporting the display.

BRIEF DESCRIPTION OF THE DRAWINGS

FIG. 19A is a perspective view showing, in an enlarging manner, an example of a structure that can be employed for one region of a second interface section of the display shown in FIGS. 17 and 18;

FIG. 19B is a perspective view showing, in an enlarging manner, an example of a structure that can be employed for the other region of the second interface section of the display shown in FIGS. 17 and 18;

FIG. 20 is a plan view schematically showing another example of a display, a display surface of which is constituted by a plurality of pixels arranged in a matrix form; and FIG. 21 is a plan view schematically showing an example of a labeled article in which a label for suppressing forgery or a label for identification is supported by an article.

DESCRIPTION OF EMBODIMENTS

Figure 1:
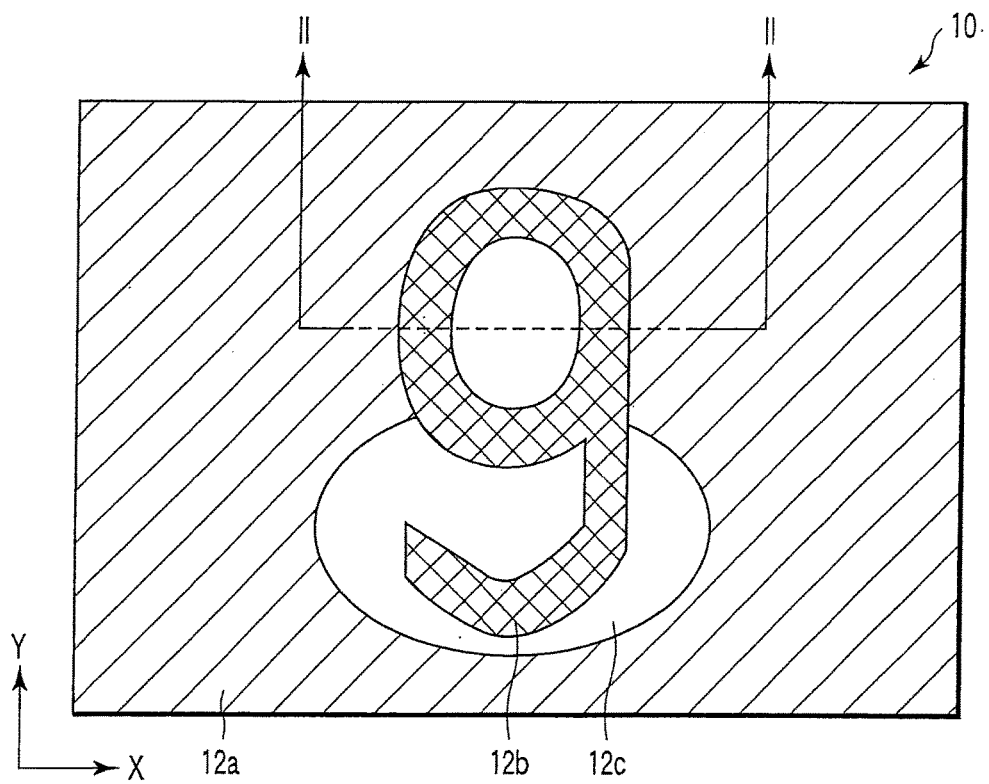
FIG. 1 is a plan view schematically showing a display according to a first aspect of the present invention.

Embodiments of the present invention will be described below in detail with reference to the accompanying drawings. Incidentally, in the drawings, constituent elements exhibiting the identical or similar function are denoted by the identical reference symbols, and a duplicate description will be omitted.

Figure 2:
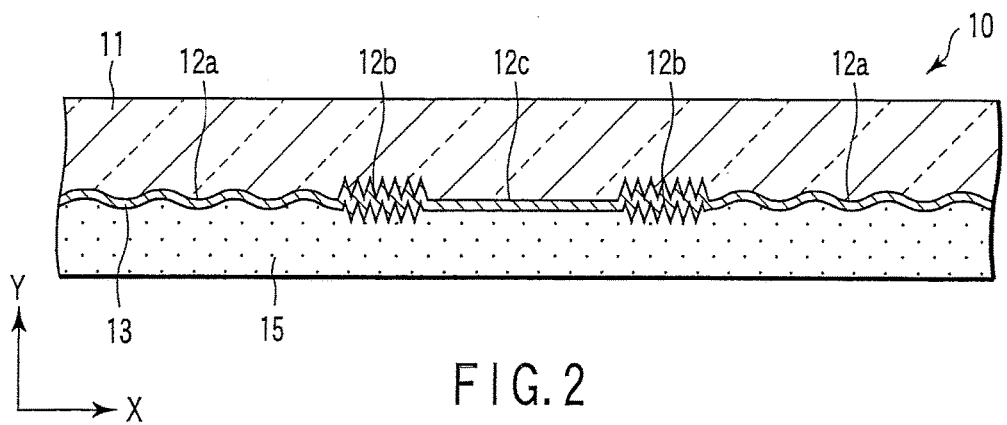
FIG. 2 is a cross-sectional view of the display shown in FIG. 1 taken along the line II-II.

FIG. 1 is a plan view schematically showing a display according to a first embodiment of the present invention. FIG. 2 is a cross-sectional view of the display shown in FIG. 1 taken along the line II-II.

This display 10 includes a laminated body of a light transmission layer 11 and a reflection layer 13. In the example shown in FIG. 2, the front surface side is on the side of the light transmission layer 11, and the rear surface side is on the side of the reflection layer 13. An interface between the light transmission layer 11 and the reflection layer 13 includes a first interface section 12a, a second interface section 12b, and a third interface section 12c. As will be described later, the first interface section 12a is provided with a plurality of grooves, and the second interface section 12b is provided with a plurality of recesses or projections.

As a material for the light transmission layer 11, for example, a resin with optical transparency can be used. For example, when a thermoplastic resin, a thermosetting resin, or a photo-setting resin is used, it is possible to easily form a light transmission layer 11 provided with a plurality of grooves and a plurality of recesses or projections on one main surface thereof by transfer using a master.

As the reflection layer 13, for example, a metallic layer made of a metallic material such as aluminum, silver, and alloys thereof can be used. Alternatively, a dielectric material layer with a refractive index different from that of the light transmission layer 11 may be used as the reflection layer 13. Further, as the reflection layer 13, a laminated body of dielectric layers in which adjacent layers have different refractive indeces, i.e. a multilayered dielectric film, may be used. However, it is necessary for one of the dielectric layers in contact with the light transmission layer 11, the dielectric layers being included in the dielectric multilayer film, to have a refractive index different from that of the light transmission layer 11.

Either of the light transmission layer 11 and the reflection layer 13 may be omitted. However, when the display 10 includes both the light transmission layer 11 and the reflection layer 13, the interface is hardly damaged and the display can display an image with better visibility as compared with the case where the display 10 includes only one of them. Particularly, because the second interface section is low in visible light reflectance due to the structure thereof, the higher the reflectance of the reflection layer 13 is, the more conspicuous a difference between the second interface section and other sections becomes. Further, by spatially distributing the regions in which the reflection layers 13 are present, it is also possible to express a pattern by using the distribution of the reflection layers, for example, by using a contour of the region in which the reflection layer is present.

The display 10 further includes an adhesion layer 15 covering the reflection layer 13. When the display 10 includes both the light transmission layer 11 and the reflection layer 13, the shape of the surface of the reflection layer 13 is usually substantially identical with that of the interface between the light transmission layer 11 and the reflection layer 13. When the adhesion layer 15 is provided, it is possible to prevent the surface of the reflection layer 13 from being exposed, and hence the plural grooves and the plural recesses or projections are difficult of duplication. When the side on the light transmission layer 11 is the rear surface side and the side on the reflection layer 13 is the front surface side, the adhesion layer 15 is formed on the light transmission layer 11. In this case, not the interface between the light transmission layer 11 and the reflection layer 13, but an interface between the reflection layer 13 and the outside includes the first interface section 12a, the second interface section 12b, and the third interface section 12c. Further, the adhesion layer 15 may be omitted.

Figure 3:
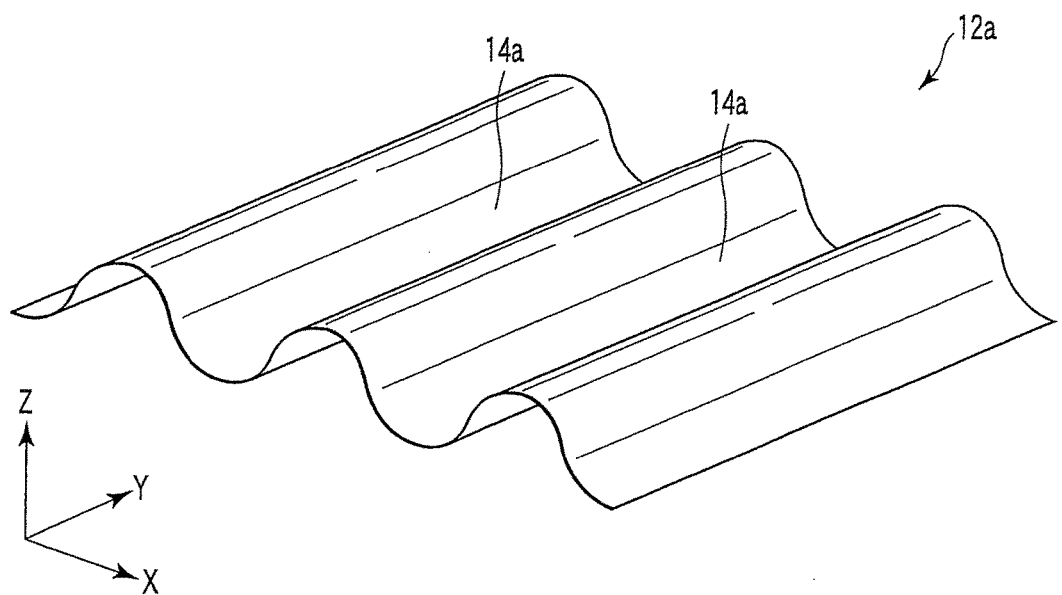
FIG. 3 is a perspective view showing, in an enlarging manner, an example of a structure that can be employed for a first interface section of the display shown in FIGS. 1 and 2.
Figure 4:
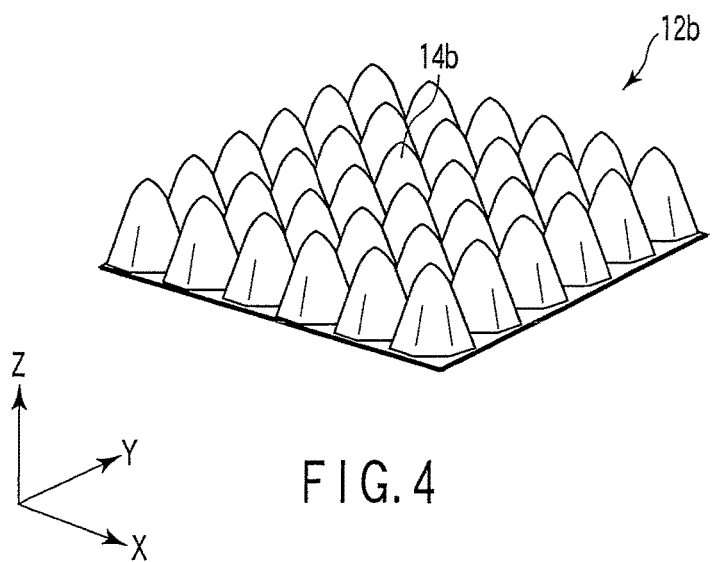
FIG. 4 is a perspective view showing, in an enlarging manner, an example of a structure that can be employed for a second interface section of the display shown in FIGS. 1 and 2.

FIG. 3 is a perspective view showing, in an enlarging manner, an example of a structure that can be employed for the first interface section of the display shown in FIGS. 1 and 2. FIG. 4 is a perspective view showing, in an enlarging manner, an example of a structure that can be employed for the second interface section of the display shown in FIGS. 1 and 2.

The first interface section 12a is provided with a relief-type diffraction grating in which a plurality of grooves are arranged. A distance between centers of the grooves 14a is within a range of, for example, 0.5 μm to 2 μm. Further, a depth of the groove 14a is within a range of, for example, 0.05 μm to 1 μm, and is typically within a range of 0.05 μm to 0.3 μm.

Incidentally, it is assumed that the term "diffraction grating" implies a structure that generates a diffracted wave by being irradiated with illumination light such as the natural light, and includes interference fringes recorded on a hologram in addition to an ordinary diffraction grating in which a plurality of grooves 14a are arranged in parallel with each other at regular intervals. Further, the groove 14a or a part between grooves 14a is called a "grating line".

The second interface section 12b is provided with a plurality of recesses or projections 14b. These recesses or projections 14b are arranged two-dimensionally at a center-to-center distance smaller than the minimum center-tocenter distance of the grooves 14a. Each recess or projection 14b has a forward tapered shape. A depth or a height of the recess or projection 14b is normally larger than the depth of the groove 14a, and is typically within a range of 0.3 μm to 0.5 μm.

The third interface section 12c is a flat surface. The third interface section 12c may be omitted.

This display 10 includes the second interface section 12b provided with the plural recesses or projections 14b. As described above, the recesses or projections 14b are arranged two-dimensionally at a center-to-center distance smaller than the minimum center-to-center distance of the grooves 14a. That is, this display 10 includes a structure finer than that of the grooves 14a constituting the diffraction grating at the second interface section 12b.

It is difficult to accurately analyze such a fine structure from the completed display 10. Further, even if the fine structure can be analyzed from the completed display 10, the display including the fine structure is difficult of forgery or imitation. Although in the case of the diffraction grating, the structure is sometimes copied as interference fringes by an optical duplicating method utilizing laser light or the like, the fine structure of the second interference section 12b cannot be duplicated.

Further, this display 10 has a very unique visual effect. That is, the first interface section 12a produces diffracted light with wavelength dispersion and is seen as prismatic colors that cause color-shift according to the viewpoints, and hence, the first interface section 12a is recognized as a normal interface on which a diffraction grating is formed. Further, when a metallic layer is used as the reflection layer 13, in the condition that the diffracted light is not observed, a metallic luster can be observed at the first interface section 12a as at the third interface section 12c. Conversely, the second interface section 12b is typically seen as a black printed layer formed as if it overlaps a part of the diffraction grating. Therefore, it is difficult for a person trying to conduct forgery or imitation to recognize the fact itself that the fine structure is present at the second interface section 12b.

Accordingly, when this display 10 is used as a forgery prevention label, a high forgery prevention effect can be realized.

The visual effect of this display 10 will be described below in more detail.

First, a visual effect resulting from the first interface section 12a will be described.

When the diffraction grating is illuminated, the diffraction grating emits strong diffracted light in a specific direction with respect to a traveling direction of the illumination light as the incident light.

When light travels in a plane perpendicular to the grating lines of the diffraction grating, an angle of emergence β of m-order diffracted light can be calculated by the following formula (1) in which m=0, ±1, ±2, . . .

$$d = m\lambda/(\sin \alpha - \sin \beta) \quad (1)$$

In this formula (1), d represents a grating constant of the diffraction grating, and λ represents a wavelength of the incident light and the diffracted light. Further, α represents the angle of emergence of the 0-order diffracted light, i.e. of the transmitted light or the regular reflected light. In other words, α is equal in absolute value to the incident angle of the illumination light, and is symmetrical to the incident angle with respect to the Z axis (in the case of the reflection-type diffraction grating). Incidentally, as for α and β, the clockwise direction from the Z axis is the positive direction.

The most representative diffracted light is the 1st-order diffracted light. As is evident from the formula (1), the angle of emergence β of the 1st-order diffracted light changes according to the wavelength λ. That is, the diffraction grating has a function as a spectroscope. Accordingly, when the illumination light is white light, if the observation angle is changed in a plane perpendicular to the grating lines of the diffraction grating, the color perceived by the observer will be changed.

Further, the color perceived by the observer under a certain observation condition changes according to the grating constant d.

As an example, it is assumed that the diffraction grating emits 1st-order diffracted light in the normal direction thereof. That is, it is assumed that the angle of emergence β of the 1st-order diffracted light is 0°. Further, it is assumed that the observer perceives this 1st-order diffracted light. When it is assumed that the angle of emergence of the 0-order diffracted light at this time is $\alpha_N$, the formula (1) can be simplified to the following formula (2).

$$d = \lambda/\sin \alpha_N \quad (2)$$

As is evident from the formula (2), in order to allow the observer to perceive a specific color, it is sufficient if a wavelength λ corresponding to the color, an incident angle $|\alpha_N|$ of the illumination light, and a grating constant d are set such that they satisfy the relationship shown by the formula (2). For example, it is assumed that white light including all the light components having wavelengths within a range of 400 nm to 700 nm is used as the illumination light, and the incident angle $|\alpha_N|$ of the illumination light is 45°. Further, it is assumed that a diffraction grating in which the spatial frequency, i.e., the reciprocal of the grating constant is distributed within a range of 1000 pcs./mm to 1800 pcs./mm is used. In this case, when the diffraction grating is observed from the normal direction thereof, a part in which the spatial frequency is about 1600 pcs./mm is seen blue, and a part in which the spatial frequency is about 1100 pcs./mm is seen red.

Incidentally, a diffraction grating in which the spatial frequency is smaller can be formed easier. For this reason, in an ordinary display, most of the diffraction gratings are diffraction gratings of which the spatial frequency is distributed within a range of 500 pcs./mm to 1600 pcs./mm.

Thus, the color perceived by the observer under certain observation conditions can be controlled by the grating constant d (or the spatial frequency). Further, when the observation angle is changed in the above observation conditions, the color perceived by the observer will be changed.

In the above description, it is assumed that the light travels in a plane perpendicular to the grating line. When the direction of the grating lines is changed from this state around the normal of the diffraction grating surface, the effective value of the grating constant d with respect to a certain observation direction changes according to the angle of the grating line with respect to the reference state (hereinafter referred to as an azimuth angle). As a result of this, the color perceived by the observer is changed. Conversely, when a plurality of diffraction gratings different only in the direction of the grating lines are arranged, it is possible to allow the diffraction gratings to display different colors. Further, when the azimuth angle becomes sufficiently large, it becomes impossible to recognize the diffracted light from a certain observation direction, and the observation result is the same as the case where the diffraction grating is absent. By utilizing this, and by using diffraction gratings of two types or more which are largely different from each other in the direction of the grating lines, it is also possible to allow them to display images independent from each other when observed from directions corresponding to the respective grating lines.

Further, when the depth of the grooves 14a constituting the diffraction grating is made large, the diffraction efficiency will be changed (depending also on the wavelength or the like of the illumination light). Further, when the ratio of the area of the diffraction grating to that of the pixel to be described later is made larger, the intensity of the diffracted light becomes higher.

Accordingly, when the first interface section 12a is formed by arranging a plurality of pixels, if one part of the pixels are made different from another part of the pixels in the spatial frequency and/or the azimuth angle of the grooves 14a, it is possible to allow the pixels to display different colors, and is possible to set conditions under which observation is enabled. Further, if one part of the pixels constituting the first interface section 12a are made different from another part of the pixels in at least one of the depth of the grooves 14a and/or the ratio of the area of the diffraction grating to that of the pixel, it is possible to make the pixels differ from each other in the luminance. Therefore, by utilizing these, it is possible to allow the first interface section 12a to display an image such as a full-color image and a three-dimensional image.

Incidentally, the "image" mentioned herein implies something that can be observed as spatial distribution of the color and/or the luminance. The "image" includes a photograph, a figure, a picture, a character, a mark, and the like.

Next, a visual effect resulting from the second interface section 12b will be described.

Figure 5:
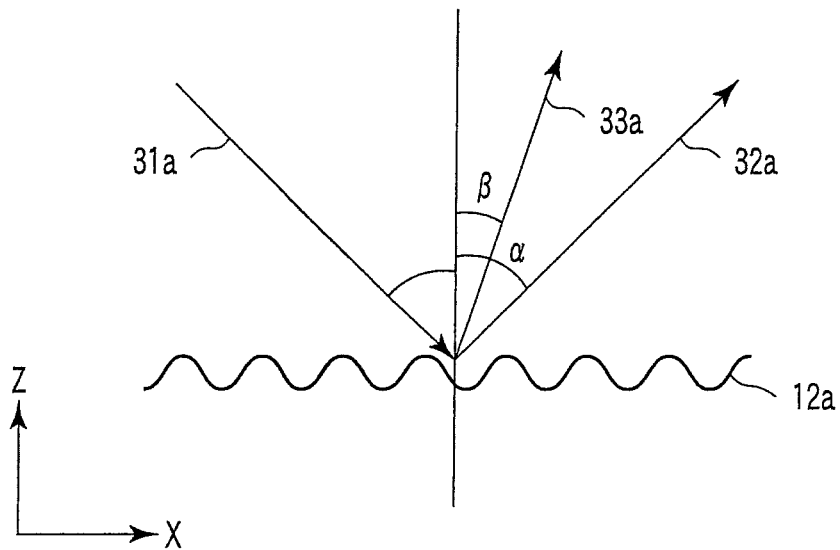
FIG. 5 is a view schematically showing a state where the first interface section emits diffracted light.
Figure 6:
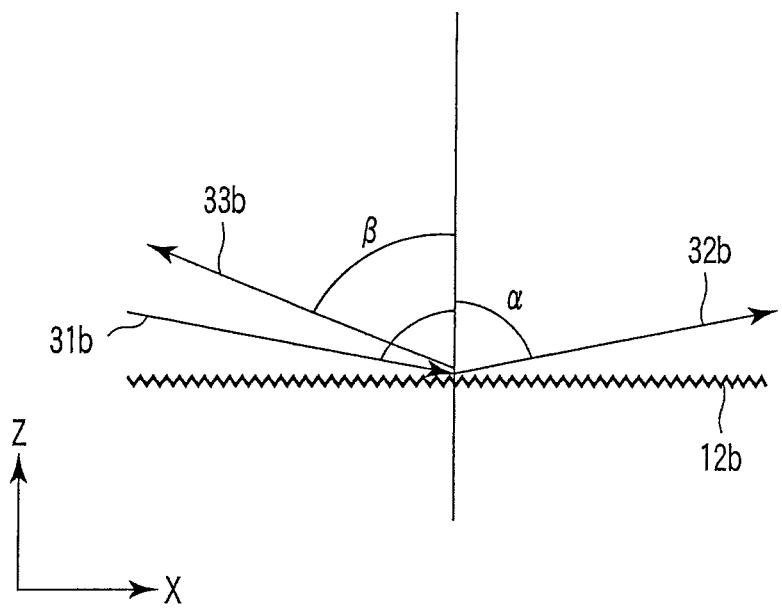
FIG. 6 is a view schematically showing a state where the second interface section emits diffracted light.

FIG. 5 is a view schematically showing the state where the first interface section emits diffracted light. FIG. 6 is a view schematically showing the state where the second interface section emits diffracted light. In FIGS. 5 and 6, 31a and 31b denote illumination light, 32a and 32b denote regular reflected light or 0-order diffracted light, and 33a and 33b denote 1st-order diffracted light.

As described above, a plurality of recesses or projections 14b provided at the second interface section 12b are arranged two-dimensionally at a center-to-center distance smaller than the minimum center-to-center distance of the grooves 14a, i.e. the grating constant of the diffraction grating. For this reason, even if the recesses or projections 14b are arranged regularly, and the second interface section 12b emits diffracted light 33b, the observer will not perceive the diffracted light 33b simultaneously with the diffracted light 33a from the first interface section 12a having the same wavelength as these. Particularly, when the difference between the grating constant and the center-to-center distance of the recesses or projections 14b is sufficiently large, the observer cannot perceive the diffracted light 33a from the first interface section 12a simultaneously with the diffracted light 33b from the second interface section 12b irrespective of what the wavelength is. However, as is understood from the formula (1), when diffracted light of a higher order ($|m| \geq 2$) is produced, it is also possible to enable the diffracted light 33b from the second interface section 12b to be visually confirmed within a observation angle range in which the diffracted light 33a of the higher order from the first interface section 12a can be visually confirmed.

Further, each of the recesses or projections 14b has a forward tapered shape. It has been found that with the forward tapered shape, the reflectance of the regular reflected light of the second interface section 12b is small irrespective of the observation angle.

Accordingly, for example, when the display 10 is observed from the normal direction thereof, the second interface section 12b is seen darker than the first interface section 12a. Further, in this case, the second interface section 12b is typically seen black. Incidentally, the term "black" implies that the reflectance is 10% or less with respect to all the light components whose wavelengths are within a range of 400 nm to 700 nm when, for example, the display 10 is irradiated with light from the normal direction and the intensity of the regular reflected light is measured. Therefore, the second interface section 12b seems as if it is a black printed layer formed such that it overlaps a part of the diffraction grating.

Further, when the angle of emergence of the 1st-order diffracted light 33b from the second interface section 12b is larger than −90°, the observer can perceive the 1st-order diffracted light 33b from the second interface section 12b by appropriately setting the angle formed between the normal direction of the display 10 and the observation direction. Accordingly, in this case, it is possible to visually confirm that the second interface section 12b is different from a black printed layer.

When these configurations are employed, the center-to-center distance of the recesses or projections 14b may be set within a range of, for example, 200 nm to 350 nm. In this case, as is evident from the formula (1), diffracted light having a wavelength corresponding to the blue color can be easily observed at the second interface section 12b. Therefore, for example, when the first interface section 12a emits diffracted light having a wavelength corresponding to the red color, it becomes easier to confirm that the display 10 is genuine by the comparison of these colors.

Incidentally, when the second interface section 12b is formed by arranging a plurality of pixels, if one part of the pixels are made different from another part of the pixels in at least one of the shape, the depth or the height, the center-to-center distance, and the arrangement pattern of the recesses or projections 14b, it is possible, as will be described later in detail, to make the pixels differ from each other in the reflectance or the like thereof. Accordingly, by utilizing this, a gray-scale image can be displayed on the second interface section 12b.

Further, in this display 10, the first interface section 12a and the second interface section 12b are in the same plane. Therefore, a concave structure and/or a convex structure corresponding to the grooves 14a and the recesses or the projections 14b are formed on one original plate, and the concave structure and/or the convex structure are transferred onto the light transmission layer 11, whereby the grooves 14a and the recesses or projections 14b can be simultaneously formed. Accordingly, when the concave structure and/or the convex structure are formed on the original plate with high accuracy, a problem of misalignment between the first interface section 12a and the second interface section 12b cannot occur. Further, the features of the fine concave-convex structure and the high accuracy enables high-definition image display, and enables easy distinction from those made by the other methods. The fact that a genuine article can be stably manufactured with very high accuracy further facilitates distinction between the genuine article and a forged article or an imitated article.

As for an image displayed by the display 10, it is advantageous that the image is constituted by a plurality of pixels arranged two-dimensionally. This will be described below.

Figure 7:
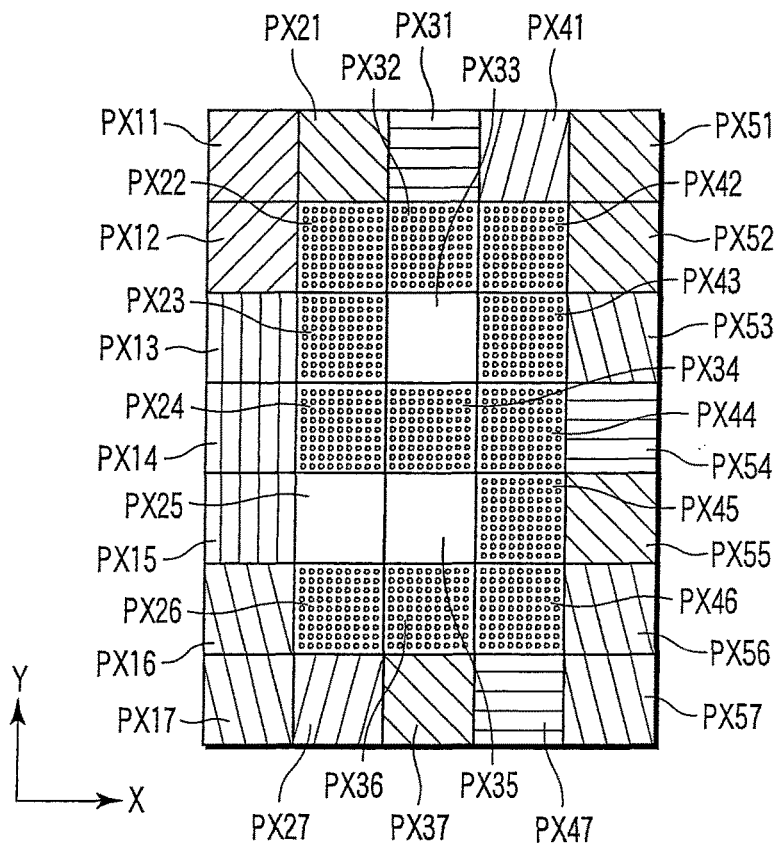
FIG. 7 is a plan view schematically showing an example of a display, a display surface of which is constituted by a plurality of pixels arranged in a matrix form.

FIG. 7 is a plan view schematically showing an example of a display whose surface is constituted by a plurality of pixels arranged in a matrix form.

In this display 10, the display surface is constituted by thirty-five pixels PX11 to PX17, PX21 to PX27, PX31 to PX37, PX41 to PX47, and PX51 to PX57, which are arranged in a matrix form (the tenths digit corresponds to the X direction, and the units digit corresponds to the Y direction). The pixels PX11 to PX17, PX21, PX27, PX31, PX37, PX41, PX47, and PX51 to PX57 constitute the first interface section 12a. The pixels PX22 to PX24, PX26, PX32, PX34, PX36, and PX42 to PX46 constitute the second interface section 12b. The pixels PX25, PX33, and PX35 constitute the third interface section 12c.

The pixels PX11 and PX12 have the same structure, the pixels PX13 to PX15 have the same structure, the pixels PX16, PX17, PX53, PX56, and PX57 have the same structure, the pixels PX21, PX37, PX51, PX52, and PX55 have the same structure, the pixels PX27 and PX41 have the same structure, and the pixels PX31, PX47, and PX54 have the same structure. Further, the pixel group constituted by the pixels PX11 and PX12, the pixel group constituted by the pixels PX13 to PX15, the pixel group constituted by the pixels PX16, PX17, PX53, PX56, and PX57, the pixel group constituted by the pixels PX21, PX37, PX51, PX52, and PX55, the pixel group constituted by the pixels PX27 and PX41, and the pixel group constituted by the pixels PX31, PX47, and PX54 are different from one another in the structure of the diffraction grating. As an example, in FIG. 7, these pixel groups are made different from one another only in the azimuth angle of the diffraction grating.

Further, the pixels PX22 to PX24, PX26, PX32, PX34, PX36, and PX42 to PX46 have the same structure. Further, the pixels PX25, PX33, and PX35 have the same structure.

That is, in the display 10 shown in FIG. 7, the image is constituted by the eight types of pixels. If the visual effect of each of the eight types of pixels is known, an image obtained by rearranging the pixels can be easily forecast. Therefore, it is possible to determine a structure to be employed for each pixel from digital image data with ease. Accordingly, when the image to be displayed on the display 10 is constituted by a plurality of pixels arranged two-dimensionally, designing the display 10 becomes easy.

Incidentally, in the display 10 shown in FIG. 7, although the image is constituted by the eight types of pixels, it is sufficient if the number of types of pixels forming the image is two or more. When the number of the types of pixels is increased, a more complicated image can be displayed.

Further, in the display 10 shown in FIG. 7, although the image is constituted by the thirty-five pieces of pixels, it is sufficient if the number of pixels constituting the image is two or more. When the number of the pixels is increased, a more high-definition image can be displayed.

In the display 10 shown in FIG. 7, although the first interface section 12a is constituted by the six types of pixels which are different from one another only in the azimuth angle, the first interface section 12a may be constituted by a plurality of types of pixels which are different from each other in the structure of the diffraction grating. That is, the first interface section 12a may be constituted by a plurality of types of pixels which are different from each other in at least one of the spatial frequency, the azimuth angle, the depth, and the ratio of the area of the diffraction grating to that of the pixel of the grooves 14a. Alternatively, the first interface section 12a may be constituted by pixels of one type.

Further, in the display 10 shown in FIG. 7, although the second interface section 12b is constituted by the pixels of one type, the second interface section 12b may be constituted by a plurality of types of pixels which are different from each other in at least one of the shapes, the depth or the height, the center-to-center distance, and the arrangement pattern of the recesses or projections 14b.

FIGS. 8 to 11 are plan views each schematically showing an example of an arrangement pattern of recesses or projections that can be employed for the second interface section.

Figure 8:
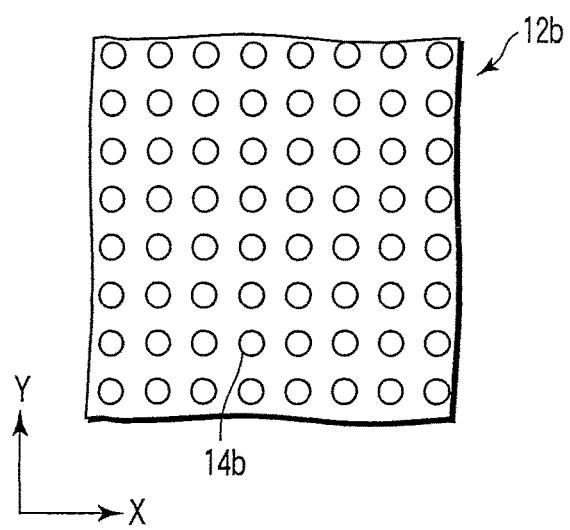
FIG. 8 is a plan view schematically showing an example of an arrangement pattern of recesses or projections that can be employed for the second interface section.
Figure 9:
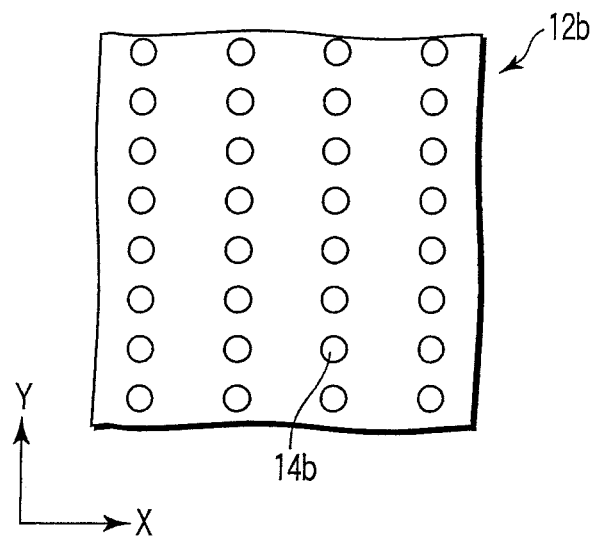
FIG. 9 is a plan view schematically showing an example of an arrangement pattern of recesses or projections that can be employed for the second interface section.

In FIG. 8, the arrangement of the recesses or projections 14b forms a square lattice. This structure can be manufactured comparatively easily by using a micromachining apparatus such as an electron beam drawing apparatus and a stepper, and the center-to-center distance or the like of the recesses or projections 14b can be controlled with high accuracy comparatively easily.

Further, in the structure shown in FIG. 8, the recesses or projections 14b are regularly arranged. Accordingly, when the center-to-center distance of the recesses or projections 14 is set comparatively long, it is possible to allow the second interface section 12b to emit diffracted light. In this case, it is possible to visually confirm that the second interface section 12b is different from a black printed layer. Further, when the center-to-center distance of the recesses or projections 14b is set comparatively short, for example, when is set at 200 nm or less, the second interface section 12b can be prevented from emitting diffracted light. In this case, as for the observed color, it becomes difficult to visually confirm that the second interface section 12b is different from a black printed layer.

In FIG. 8, the center-to-center distance of the recesses or projections 14b in the X direction and that in the Y direction are made equal to each other. However, the center-to-center distances of the recesses or projections 14b may be made different in the X direction and the Y direction. That is, the arrangement of the recesses or projections 14b may form a rectangular lattice.

When the center-to-center distances of the recesses or projections 14b are set comparatively long in both of the X direction and the Y direction, it is possible to allow the second interface section 12b to emit diffracted light in both the case where the display 10 is illuminated from a direction perpendicular to the Y direction and the case where the display 10 is illuminated from a direction perpendicular to the X direction, and is possible to make the wavelength of the diffracted light different from each other in the former case and in the latter case. When the center-to-center distances of the recesses or projections 14b are set comparatively short in both the X direction and the Y direction, it is possible to prevent the second interface section 12b from emitting diffracted light irrespective of the illumination direction. When the center-to-center distances of the recesses or projections 14b are set comparatively long in one of the X direction and the Y direction, and are set comparatively short in the other of the directions, it is possible to allow the second interface section 12b to emit diffracted light when the display 10 is illuminated from a direction perpendicular to one of the Y direction and the X direction, and prevent the second interface section 12b from emitting diffracted light when the display 10 is illuminated from a direction perpendicular to the other of the Y direction and the X direction.

Figure 11:
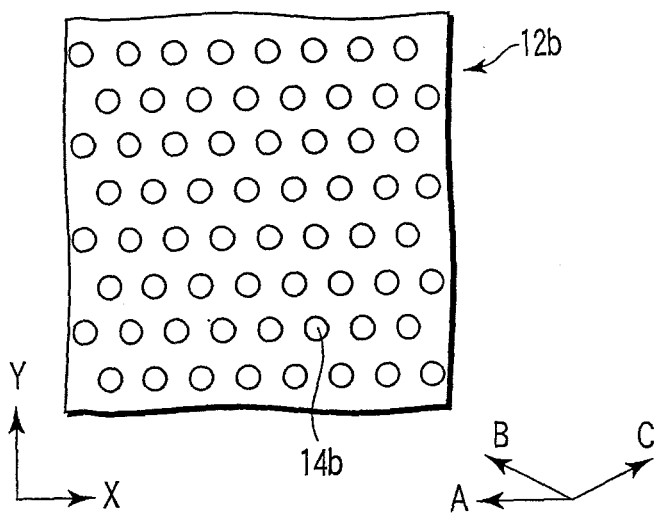
FIG. 11 is a plan view schematically showing an example of an arrangement pattern of recesses or projections that can be employed for the second interface section.

In FIG. 11, the arrangement of the recesses or projections 14b forms a triangular lattice. When this structure is employed, as in the case where the structure shown in FIG.

8 is employed, if the center-to-center distance of the recesses or projections 14*b* is set comparatively long, it is possible to allow the second interface section 12*b* to emit diffracted light, and if the center-to-center distance of the recesses or projections 14*b* is set comparatively short, it is possible to prevent the second interface section 12*b* from emitting diffracted light.

Further, when the structure shown in FIG. 11 is employed, if the center-to-center distance of the recesses or projections 14*b* is appropriately set, it is possible to prevent the second interface section 12*b* from emitting diffracted light when the display 10 is illuminated from, for example, the direction A, and allow the second interface section 12*b* to emit diffracted light when the display 10 is illuminated from the direction B or C. That is, a more complicated visual effect can be obtained.

Figure 12:
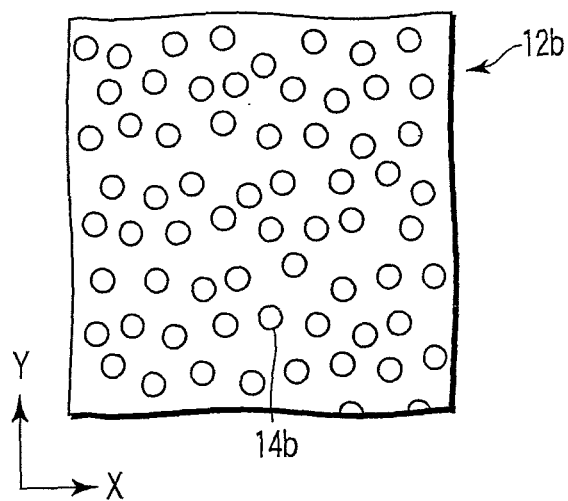
FIG. 12 is a plan view schematically showing an example of an arrangement pattern of recesses or projections that can be employed for the second interface section.

In FIG. 12, recesses or projections 14*b* are arranged irregularly. When the recesses or projections 14*b* are arranged irregularly, it becomes more difficult for the second interface section to emit diffracted light. Incidentally, this structure can be formed by, for example, recording intensity distribution of speckles and utilizing interference of light.

Figure 10:
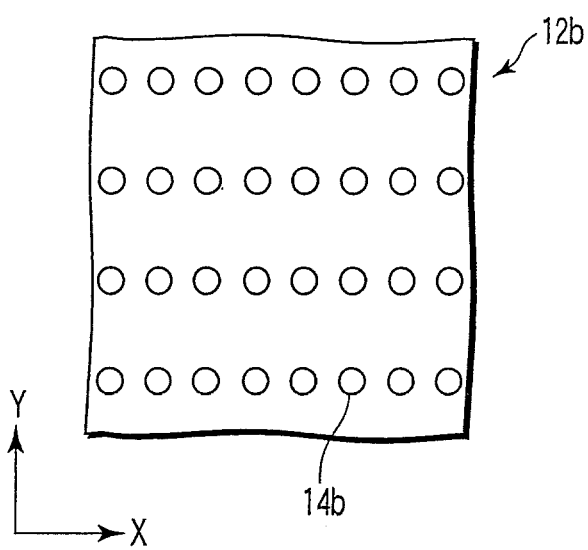
FIG. 10 is a plan view schematically showing an example of an arrangement pattern of recesses or projections that can be employed for the second interface section.
Figure 13:
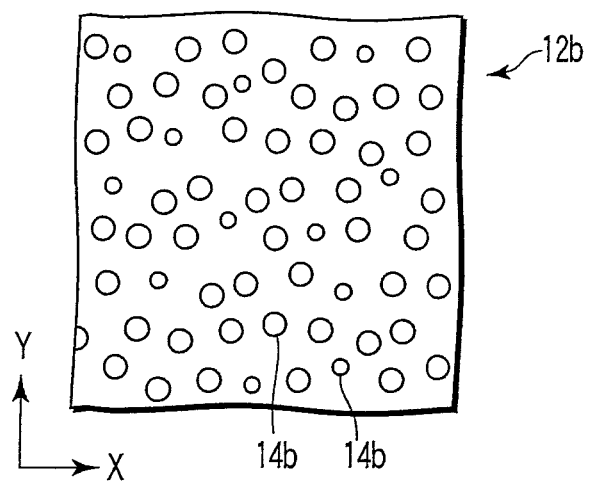
FIG. 13 is a plan view schematically showing an example of an arrangement pattern of recesses or projections that can be employed for the second interface section.

In FIG. 13, in addition to the fact that the recesses or projections 14*b* are arranged irregularly, their sizes are nonuniform. When this structure is employed, it becomes more difficult for the second interface section to emit diffracted light than in the case where the structure shown in FIG. 10 is employed.

As exemplified in FIGS. 8 to 13, the arrangement pattern of the recesses or projections 14*b* can be variously modified. Further, each arrangement pattern has its inherent visual effect or the like. Therefore, when the second interface section 12*b* is constituted by a plurality of pixels different in the arrangement pattern of the recesses or projections 14*b*, more complicated visual effect can be obtained.

Figure 14:
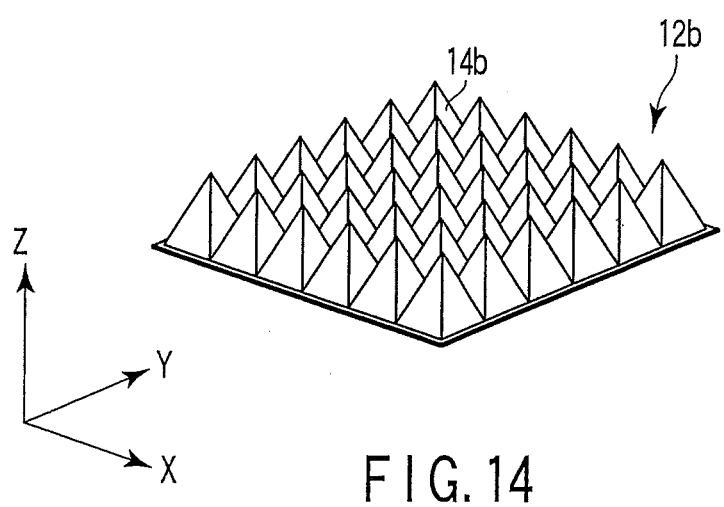
FIG. 14 is a perspective view showing, in an enlarging manner, another example of a structure that can be employed for the second interface section of the display shown in FIGS. 1 and 2.
Figure 15:
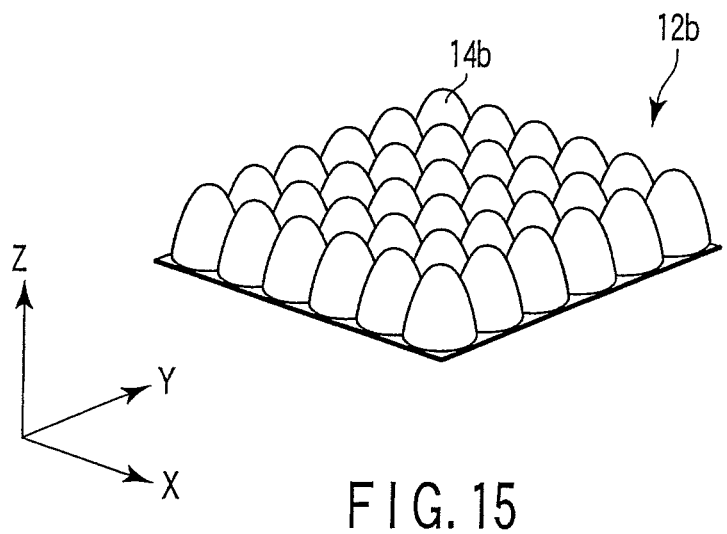
FIG. 15 is a perspective view showing, in an enlarging manner, still another example of a structure that can be employed for the second interface section of the display shown in FIGS. 1 and 2.
Figure 16:
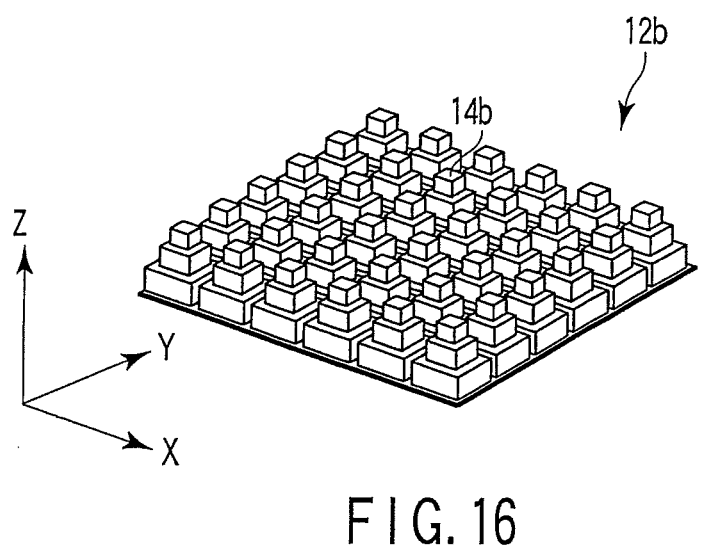
FIG. 16 is a perspective view showing, in an enlarging manner, still another example of a structure that can be employed for the second interface section of the display shown in FIGS. 1 and 2.

Each of FIGS. 14 to 16 is a perspective view showing, in an enlarging manner, another example of a structure that can be employed for the second interface section of the display shown in FIGS. 1 and 2.

Each of the structures shown in FIGS. 14 to 16 is a modification example of the structure shown in FIG. 4. Each of the recesses or projections 14*b* shown in FIGS. 14 to 16 has a forward tapered shape.

In the structure shown in FIG. 4, the recesses or projections 14*b* have a conical shape. When the recesses or projections 14*b* are made conical, tips of the recesses or projections 14*b* may be pointed, or may have a shape of a truncated cone. However, when the recesses or projections 14*b* are made pointed conical shape, the recesses or projections 14*b* have no surface parallel with the second interface section 12*b*, and hence it is possible to make the reflectance of the second interface section 12*b* for the regular reflected light much smaller than the case where the shape of truncated cones are employed.

In the structure shown in FIG. 14, recesses or projections 14*b* have a shape of a quadrangular pyramid. The recesses or projections 14*b* may have a shape of a pyramid other than the quadrangular pyramid such as a triangular pyramid. In this case, it is possible to enhance the intensity of diffracted light that occurs under a specified condition, thereby further facilitating observation. Further, when the recesses or projections 14*b* have a pyramid shape, tips of the recesses or projections 14 may be pointed, or may have a shape of a truncated pyramid. However, when the recesses or projections 14*b* have a pointed pyramid shape, the recesses or projections 14*b* have no surface parallel with the second interface section 12*b*, and hence it is possible to make the reflectance of the second interface section 12*b* for the regular reflected light much smaller than the case where the shape of truncated pyramids are employed.

In the structure shown in FIG. 15, the recesses or projections 14*b* have a semi-spindle shape. That is, the recesses or projections 14*b* have a conical shape rounded at the tip thereof. When the structure shown in FIG. 15 is employed, it is easier to form the convex structure and/or the concave structure on the master, and transfer the convex structure and/or the concave structure from the master onto the light transmission layer 11 than in the case where the structure shown in FIG. 4 or FIG. 14 is employed.

In the structure shown in FIG. 16, the recesses or projections 14*b* have a structure formed by stacking a plurality of quadrangular prisms having different base areas one on top of another in the order from the one having the largest base area. Incidentally, columnar bodies other than the quadrangular prisms such as cylindrical columns and triangular prisms may be stacked in place of the quadrangular prisms.

When the structure shown in FIG. 16 is employed, it is not possible to make the reflectance of the regular reflected light of the second interface section 12*b* as small as the case where the structure shown in FIG. 4, 14, or 15 is employed. However, when the structure shown in FIG. 16 is employed, as in the case where the structure shown in FIG. 15 is employed, it is easier to form the convex structure and/or the concave structure on the master, and transfer the convex structure and/or the concave structure from the master onto the light transmission layer 11 than the case where the structure shown in FIG. 4 or FIG. 14 is employed.

As described above, the shape of the recesses or projections 14*b* influences the reflectance of the second interface section 12*b*. Accordingly, when the second interface section 12*b* is constituted by a plurality of pixels different in the shape of the recesses or projections 14*b*, a gray-scale image can be displayed on the second interface section 12*b*.

When the center-to-center distance of the recesses or projections 14*b* is made smaller, the second interface section 12*b* becomes seen darker. Particularly, when the center-to-center distance of the recesses or projections 14*b* is made 400 nm or less, as is evident from the formula (2), irrespective of the incident angle of the illumination light, it is possible to prevent the second interface section 12*b* from emitting diffracted light in the normal direction with respect to all the wavelengths in the range of 400 nm to 700 nm, i.e., the range of the visible light wavelengths. Therefore, when the second interface section 12*b* is constituted by a plurality of pixels different in the center-to-center distance of the recesses or projections 14*b*, a gray-scale image can be displayed on the second interface section 12*b*.

When the depth or the height of the recesses or projections 14*b* is made larger, the second interface section 12*b* becomes seen darker. For example, when the depth or the height of the recesses or projections 14*b* is made equal to or larger than half their center-to-center distance, the second interface section 12*b* becomes seen very dark. Therefore, when the second interface section 12*b* is constituted by a plurality of pixels different from each other in the depth or the height of the recesses or projections 14*b*, a gray-scale image can be displayed on the second interface section 12*b*.

When the ratio of a size of the recesses or projections 14*b* in a direction parallel with the second interface section 12*b* to a center-to-center distance of the recesses or projections 14*b* in the same direction as the above direction is made nearer to 1:1, the second interface section 12*b* becomes seen darker. Further, when the size of the recesses or projections 14*b* in the direction parallel with the second interface section 12b is made equal to the center-to-center distance of the recesses or projections 14b in the same direction as the above direction, the second interface section 12b becomes seen darkest. Accordingly, when the second interface section 12b is constituted by a plurality of pixels different from each other in the above ratio, a gray-scale image can be displayed on the second interface section 12b.

Although examples of the case where the first interface section 12a and the second interface section 12b are arranged in the same plane have been described above, they may be arranged in different planes. For example, first and second light transmission layers are stacked, a first reflection layer is interposed between them, and the surface of the second light transmission layer is covered with a second reflection layer. When a metallic layer is used as the first reflection layer, the first reflection layer is patterned so that the second reflection layer can be seen from the first light transmission layer's side. Further, at least a part of an interface between the first light transmission layer and the first reflection layer is made one of the first interface section 12a and the second interface section 12b, and at least a part of an interface between the second light transmission layer and the second reflection layer is made the other of the first interface section 12a and the second interface section 12b. When such a structure is employed, the same visual effect as those of the foregoing examples can be obtained.

Figure 17:
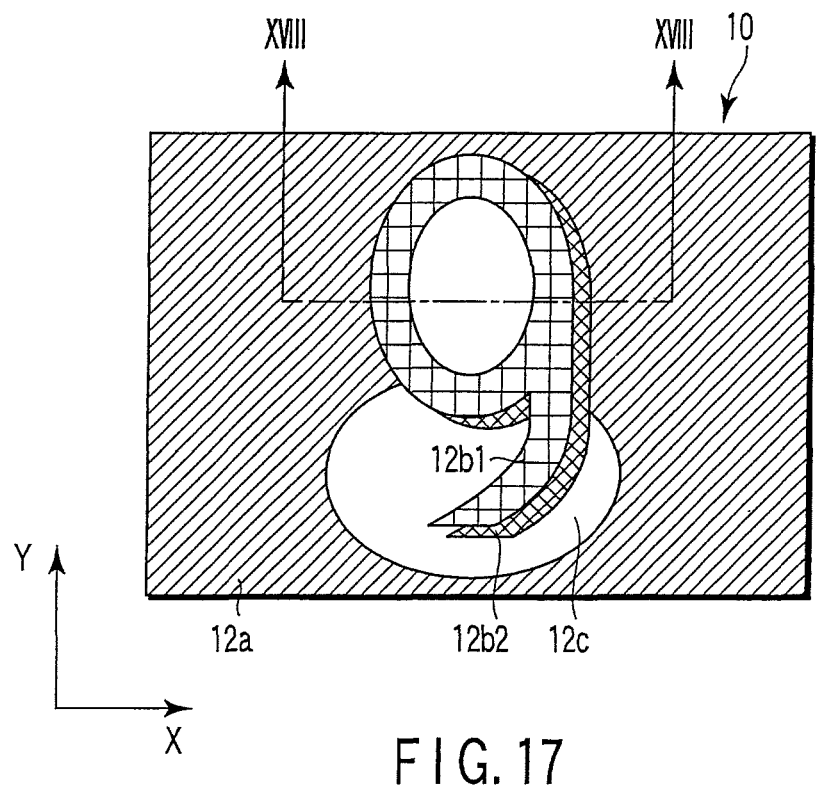
FIG. 17 is a plan view schematically showing a display according to a second aspect of the present invention.
Figure 18:
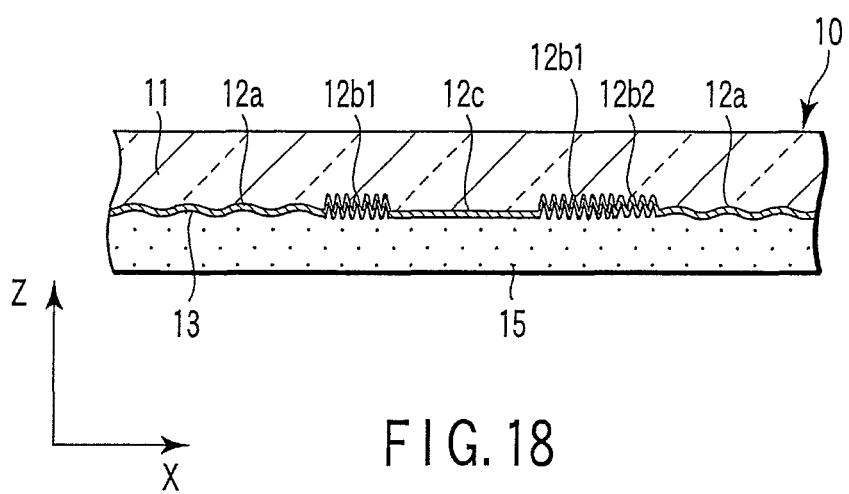
FIG. 18 is a cross-sectional view of the display shown in FIG. 17 taken along the line XVIII-XVIII.

FIG. 17 is a plan view schematically showing a display according to a second aspect of the present invention. FIG. 18 is a cross-sectional view of the display shown in FIG. 17 taken along the line XVIII-XVIII.

The display 10 shown in FIGS. 17 and 18 has the same structure as the display 10 shown in FIGS. 1 and 2 except that the second interface section 12b includes two regions 12b1 and 12b2.

FIG. 19A is a perspective view showing, in an enlarging manner, an example of a structure that can be employed for one region of the second interface section of the display shown in FIGS. 17 and 18. FIG. 19B is a perspective view showing, in an enlarging manner, an example of a structure that can be employed for the other region of the second interface section of the display shown in FIGS. 17 and 18.

Each of the regions 12b1 and 12b2 has substantially the same structure as the second interface section 12b that has been explained with reference to FIGS. 1 to 16. That is, each of the regions 12b1 and 12b2 includes a plurality of recesses or projections 14b, and these recesses or projections 14 have a forward tapered shape. Further, the regions 12b1 and 12b2 differ from each other in the center-to-center distance of the recesses or projections 14b. In the examples shown in FIGS. 19A and 19B, the center-to-center distance of the recesses or projections 14b in the region 12b2 is larger than that in the region 12b1 in each of the X direction and the Y direction.

Incidentally, it is not necessary for these recesses or projections 14b to have a forward tapered shape.

In each of the regions 12b1 and 12b2, the recesses or projections 14b are arranged regularly or irregularly. Here, it is assumed, as an example, that the recesses or projections 14b are arranged in the X direction and the Y direction that are perpendicular to each other.

These regions 12b1 and 12b2 are different from each other in the center-to-center distance, i.e. the grating constant of the recesses or projections 14b. For this reason, on the basis of the formula (1), it is possible to observe the regions 12b1 and 12b2 as regions having different colors, and is possible to make the angle ranges within which diffracted light 32b emitted thereby can be observed different from each other. Accordingly, for example, it is also possible, to make the image displayed on the second interface section 12b a color image, and to make the image displayed on the second interface section 12b vary according to the observation direction.

In the display 10 shown in FIGS. 17 and 18, it is assumed, for example, that the minimum center-to-center distance of the plural grooves 14a is equal to or larger than the minimum wavelength of the visible light, and the center-to-center distance of the plural recesses or projections 14b is smaller than the minimum wavelength of the visible light. The regions 12b1 and 12b2 are recognized as regions of the black color under the observation condition that the diffracted light emitted by the regions 12b1 and 12b2 is not observed, and under the above observation condition, the first interface section 12a can display, for example, a color resulting from the 1st-order diffracted light. Further, the regions 12b1 and 12b2 are recognized as regions of different colors under the observation condition that the diffracted light emitted by the regions 12b1 and 12b2 is observed, and under the above observation condition, the 1st-order diffracted light emitted by the first interface section 12a can be made not to contribute to display. Accordingly, for example, it is possible to allow the first interface section 12a to display a color resulting from the diffracted light and to allow the second interface section 12b to display a black color when the display 10 is observed from the normal direction thereof, and it is possible to allow only the second interface section 12b to display a multicolored image when the display 10 is observed with the display 10 inclined largely. Therefore, it is hardly noticed that the above-mentioned structure is employed at the second interface section 12b, and it is possible to allow the second interface section 12b to display a multicolored image, for example, a full-color image, and is possible to prevent the recognition of the full-color image from being disturbed by the first interface section. Conversely, it may be configured such that the high-order diffracted light from the first interface section and the 1st-order diffracted light from the second interface are observed simultaneously.

Further, the reflectance or the like of the region 12b1 and that of the region 12b2 may be made substantially equal to each other. By doing so, when the display 10 is observed from the normal direction, color senses given to the observer by the regions 12b1 and 12b2 can be made substantially equal to each other. Therefore, in this case, by making the regions 12b1 and 12b2 adjacent to each other as shown in FIGS. 1 and 2, a latent image can be formed.

In each of the regions 12b1 and 12b2, the center-to-center distance of the recesses or projections 14b in a first arrangement direction, and the center-to-center distance of the recesses or projections 14b in a second arrangement direction different from the first arrangement direction may be identical with each other or may be different from each other. In the latter case, for example, the 1st-order diffracted light having a wavelength λ emitted by the region 12b1 in the direction perpendicular to the X direction and the 1st-order diffracted light having a wavelength λ emitted by the region 12b2 in the Y direction can be made different from each other in the angle of emergence. Accordingly, for example, a color displayed on the region 12b1 or 12b2 when observed from an oblique direction perpendicular to the X direction can be made different from a color displayed on the region 12b1 or 12b2 when observed perpendicular to the Y direction by rotating the display 10 while maintaining the angle formed by the observation direction and the normal of the display 10 constant.

Accordingly, for example, it is possible to cause the display colors to be exchanged between the regions 12b1 and 12b2, or cause the regions 12b1 and 12b2 to produce different color change. Particularly, the visual effect of the former case can be easily realized by employing rectangular lattice-like arrangements that are identical with each other except that the azimuth angles are different from each other by 90° for the recesses or projections 14b of the region 12b1 and the recesses or projections 14b of the region 12b2. Thus, it is possible to obtain a high forgery prevention effect, the color change of which can be easily grasped by the observer.

FIG. 20 is a plan view schematically showing an example of a display according to a second embodiment in which the display surface is constituted by a plurality of pixels arranged in a matrix form.

In this display 10, the display surface is constituted by forty-two pixels PX11 to PX17, PX21 to PX27, PX31 to PX37, PX41 to PX47, PX51 to PX57, and PX61 to PX67, which are arranged in a matrix form (the tenths digit corresponds to the X direction, and the units digit corresponds to the Y direction). The pixels PX11 to PX17, PX21, PX27, PX31, PX37, PX41, PX47, PX51, PX57, and PX61 to PX67 constitute a first interface section 12a. The pixels PX22 to PX24, PX26, PX32, PX34, PX36, and PX42 to PX46 constitute a first region 12b1 of a second interface section 12b. The pixels PX52 to PX56 constitute a second region 12b2 of the second interface section 12b. The pixels PX25, PX33, and PX35 constitute a third interface section 12c.

The pixels PX11 and PX12 have the same structure, the pixels PX13 to PX15 have the same structure, the pixels PX16, PX17, PX63, PX66, and PX67 have the same structure, the pixels PX21, PX37, PX61, PX62, and PX65 have the same structure, the pixels PX27, PX41, and PX51 have the same structure, and the pixels PX31, PX47, PX57, and PX64 have the same structure. Further, the pixel group constituted by the pixels PX11 and PX12, the pixel group constituted by the pixels PX13 to PX15, the pixel group constituted by the pixels PX16, PX17, PX63, PX66, and PX67, the pixel group constituted by the pixels PX21, PX37, PX61, PX62, and PX65, the pixel group constituted by the pixels PX27, PX41, and PX51, and the pixel group constituted by the pixels PX31, PX47, PX57, and PX64 are different from one another in the structure of the diffraction grating. As an example, in FIG. 20, these pixel groups are made different drom one another only in the azimuth angle of the diffraction grating.

Further, the pixels PX22 to PX24, PX26, PX32, PX34, PX36, and PX42 to PX46 have the same structure. The pixels PX52 to PX56 have the same structure. Further, the pixels PX25, PX33, and PX35 have the same structure.

When the above configuration is employed, the effect described in connection with the display 10 shown in FIGS. 17 and 18 can be obtained. Additionally, when the above configuration is employed, the effect described in connection with the display 10 shown in FIG. 7 can be obtained. Incidentally, this display 10 can also be modified in the same manner as that described in connection with the display 10 shown in FIG. 7.

The display 10 described above can be used as, for example, a label for forgery prevention or identification. The display 10 is difficult of forgery or imitation, and hence when this label is supported by an article, the labeled article which is a genuine article is difficult of forgery or imitation. Further, this label has the above-mentioned visual effect, and hence an article whose genuineness is uncertain can be easily discriminated between a genuine article and a non-genuine article.

FIG. 21 is a plan view schematically showing an example of a labeled article in which a label for suppressing forgery or a label for identification is supported by an article. In FIG. 21, printed matter 100 is depicted as an example of the labeled article.

This printed matter 100 is a magnetic card, and includes a substrate 51. The substrate 51 is made of, for example, plastic. A printing layer 52 and a belt-shaped magnetic recording layer 53 are formed on the substrate 51. Further, a display 10 is adhered to the substrate 51 as a label for forgery prevention or identification. Incidentally, the display 10 has the same structure as that described previously with reference to FIGS. 1, 2, and the like except that the displayed image is different.

This printed matter 100 includes the display 10. Accordingly, as described above, this printed matter 100 is difficult of forgery or imitation. Further, because this printed matter 100 includes the display 10, an article whose genuineness is uncertain can be easily discriminated between a genuine article and a non-genuine article. Moreover, this printed matter further includes the printing layer 52 in addition to the display 10, and hence it is easy to contrast the state of vision of the printing layer 52 with the state of vision of the display. Therefore, an article whose genuineness is uncertain can be discriminated between a genuine article and an non-genuine article easier than in the case where the printed matter does not include the printing layer 52.

Incidentally, in FIG. 21, although a magnetic card is exemplified as the printed matter including the display 10, the printed matter including the display 10 is not limited to this. For example, the printed matter including the display 10 may be other types of cards such as a wireless card, an IC (integrated circuit) card, an ID (identification) card, and the like. Alternatively, the printed matter including the display 10 may be securities such as a gift certificate and a stock certificate. Still alternatively, the printed matter including the display 10 may be a tag to be attached to an article, which is to be confirmed as a genuine article. Still alternatively, the printed matter including the display 10 may be a packaging body or a part thereof for accommodating an article to be confirmed as a genuine article.

Further, in the printed matter 100 shown in FIG. 21, although the display 10 is adhered to the substrate 51, the display 10 can be supported by the substrate by other methods. For example, when paper is used as the substrate, the display 10 may be embedded in the paper, and the paper may be opened at a position corresponding to the display 10.

Further, it is not necessary for a labeled article to be printed matter. That is, the display 10 may be supported by an article including no printing layer. For example, the display 10 may be supported by an article of quality such as a work of art.

The display 10 may be used for purposes other than forgery prevention. For example, the display 10 can also be utilized as toys, tutorials, ornaments, and the like.

What is claimed is:

1. A display comprising:
a first interface section formed by arranging a plurality of first pixels and provided with a relief-type diffraction grating constituted by a plurality of grooves, the plural first pixels including two or more pixels different from each other in at least one of spatial frequency, azimuth angle, depth of the plural grooves, and a ratio of an area of the diffraction grating to that of the first pixel; and a second interface section formed by arranging a plurality of second pixels, each of the second pixels being provided with a plurality of recesses or projections arranged two-dimensionally at a center-to-center distance that is smaller than the minimum center-to-center distance of the plural grooves and is smaller than a minimum wavelength of visible light, the plural second pixels including two or more pixels different from each other in at least one of shapes, depth or height, center-to-center distance, and arrangement pattern of the plural recesses or projections, the plurality of recesses or projections each having a forward tapered shape, the first and second interface sections being in the same plane.

2. The display according to claim 1, wherein the plural recesses or projections are identical with each other in shapes, and the arrangement of the plural recesses or projections forms a square lattice or a rectangular lattice.

3. The display according to claim 1, wherein the plural recesses or projections are identical with each other in shapes, and the arrangement of the plural recesses or projections forms a triangular lattice.

4. The display according to claim 1, wherein the plural recesses or projections are arranged irregularly.

5. The display according to claim 1, wherein each of the plural recesses or projections has a pyramidal, conical, or semi-spindle shape.

6. The display according to claim 1, wherein the center-to-center distance of the plural recesses or projections is 400 nm or less.

7. The display according to claim 1, wherein the center-to-center distance of the plural recesses or projections is within a range of 200 nm to 350 nm.

8. The display according to claim 1, wherein a depth or a height of the plural recesses or projections is equal to or larger than half the center-to-center distance of the plural recesses or projections.

9. The display according to claim 1, wherein the plural recesses or projections have sizes in a direction parallel with the second interface section equal to the center-to-center distances thereof in the direction.

10. The display according to claim 1, further comprising:
a light transmission layer with a main surface including the first and second interface sections; and
a reflection layer covering the main surface of the light transmission layer.

11. A labeled article comprising:
the display according to claim 1; and
an article supporting the display.

12. A display comprising:
a first interface section formed by arranging a plurality of first pixels and provided with a relief-type diffraction grating constituted by a plurality of grooves, the plural first pixels including two or more pixels different from each other in at least one of spatial frequency, aximuth angle, depth of the plural grooves, and a ratio of an area of the diffraction grating to that of the first pixel; and
a second interface section constituted by a plurality of regions and formed by arranging a plurality of second pixels, each of the second pixels including a plurality of recesses or projections arranged one-dimensionally or two-dimensionally, the first and second interface sections being in the same plane,
one part of the plural regions and another part of the plural regions being different from each other in center-to-center distances of the plural recesses or projections, the minimum center-to-center distance of the plural grooves being equal to or larger than the minimum wavelength of the visible light, the center-to-center distance of the plural recesses or projections being smaller than the minimum wavelength of the visible light,
the plural second pixels including two or more pixels different from each other in at least one of shapes, depth or height, center-to-center distance, and arrangement pattern of the plural recesses or projections.

13. The display according to claim 12, wherein the plural recesses or projections are identical with each other in shapes, and the arrangement of the plural recesses or projections forms a square lattice or a rectangular lattice.

14. The display according to claim 12, wherein the plural recesses or projections are identical with each other in shapes, and the arrangement of the plural recesses or projections forms a triangular lattice.

15. The display according to claim 12, wherein the plural recesses or projections are arranged irregularly.

16. The display according to claim 12, wherein each of the plural recesses or projections has a pyramidal, conical, or semi-spindle shape.

17. The display according to claim 12, wherein the center-to-center distance of the plural recesses or projections is 400 nm or less.

18. The display according to claim 12, wherein the center-to-center distance of the plural recesses or projections is within a range of 200 nm to 350 nm.

19. The display according to claim 12, wherein a depth or a height of the plural recesses or projections is equal to or larger than half the center-to-center distance of the plural recesses or projections.

20. The display according to claim 12, wherein the plural recesses or projections have sizes in a direction parallel with the second interface section equal to the center-to-center distances thereof in the direction.

21. The display according to claim 12, further comprising:
a light transmission layer with a main surface including the first and second interface sections; and
a reflection layer covering the main surface of the light transmission layer.

22. The display according to claim 12, wherein the second interface section is constituted by the plural regions each including the plural recesses or projections arranged two-dimensionally, and at least one of said one part of the plural regions and said another part of the plural regions include a region in which a center-to-center distance of the plural recesses or projections in a specific arrangement direction is different from a center-to-center distance in an arrangement direction different from the specific arrangement direction.

23. The display according to claim 12, wherein the second interface section is constituted by the plural regions each including the plural recesses or projections arranged two-dimensionally, and in each of said one part of the plural regions and said another part of the plural regions, the shape of the plural recesses or projections is the same, the center-to-center distances of the plural recesses or projections in each of rows that the plural recesses or projections form are equal to each other, and the center-to-center distances of the plural recesses or projections in each of columns that the plural recesses or projections form are also equal to each other.

24. The display according to claim 12, wherein the plural regions include two or more regions equal to each other in center-to-center distances of the plural recesses or projections in a specific direction and different from each other in center-to-center distances of the plural recesses or projections in a direction perpendicular to the specific direction.

25. The display according to claim 12, wherein each of the plural recesses or projections has a forward tapered shape.

26. A labeled article comprising:
   the display according to claim 12; and
   an article supporting the display.

* * * * *

UNITED STATES PATENT AND TRADEMARK OFFICE
CERTIFICATE OF CORRECTION

PATENT NO. : 10,350,838 B2
APPLICATION NO. : 14/595802
DATED : July 16, 2019
INVENTOR(S) : Toshiki Toda et al.

Page 1 of 1

It is certified that error appears in the above-identified patent and that said Letters Patent is hereby corrected as shown below:

In the Claims

Column 17, Line 55:
In Claim 12, delete "aximuth" and insert -- "azimuth --, therefor.

Signed and Sealed this
Tenth Day of September, 2019

Andrei Iancu
*Director of the United States Patent and Trademark Office*